Patented June 25, 1946

2,402,675

UNITED STATES PATENT OFFICE 2,402,675

DEHYDRATION OF SOYBEANS

Robert M. Schaffner, Chicago, Ill., assignor to The Guardite Corporation, a corporation of Illinois No Drawing. Application June 19, 1944, Serial No. 541,122

6 Claims. (Cl. 99—204)

This invention relates to the dehydration of soy beans.

Soy beans, in unground form, may be used for various table dishes after being precooked or baked. The dehydrated bean may also be milled to produce excellent flour for breads, cakes, etc. The dehydration of the bean by a suitable vacuum process retains the high nutritional value thereof. In accordance with the present process the soy beans are first soaked in water. This is preferably accomplished between 45–70° F. and for a period of 10–48 hours. A suitable soak was 12 hours at 45° F. The beans are then drained and precooked.

Precooking may take place in a pressure retort, but is preferably accomplished in a vacuum. If cooked in a retort the beans are placed in large wire baskets and cooked from 50 to 180 minutes at temperatures of from 212–250° F., the time required being inverse to the temperature. A satisfactory retort cook may be accomplished by heating the beans at 240° F. for 60 minutes. Beans so cooked are removed from the retort and loaded on screen bottom drying trays at loading densities from 0.8 to 1.4 lbs. per square foot. The preferable cooking is accomplished in a vacuum chamber in which the beans are loaded on screen bottom drying trays at densities of 0.8 to 1.4 lbs. per square foot. The vacuum chamber is then evacuated to about ½ inch of mercury absolute to remove substantially all air. Saturated steam is then admitted to bring the temperature in the chamber to 200–250° F. The cooking time required in the vacuum chamber is substantially less than in the retort. A satisfactory cook is produced by heating for 14.4 minutes at 240° F. At 200° F., it is preferred to use 30 minutes and at 250° F. approximately 10 minutes for cooking. After the cooking is completed, the chamber is again evacuated to reduce the pressure to about ½ inch of mercury absolute and thereby cool the beans to about 60° F.

The precooked beans are dried under vacuum, suitably at about 2¼ inches pressure. The atmosphere in the vacuum dryer is substantially entirely superheated steam, and the products are exposed to intense radiant energy from surrounding steam coils. A suitable apparatus for carrying out the drying and precooking is illustrated in Heineman application 520,773, filed February 2, 1944, and Baer application 524,177, filed February 28, 1944. In that apparatus the heating coils are 2¼ inches external diameter pipes about ¼ inch apart, and the nearest point of which is about 3 inches from the bottom of the tray. In the drying apparatus superheated steam is introduced to the drying chamber at the beginning and end thereof and is withdrawn from the middle.

The radiant heat surfaces will vary in temperature from 350° F. at the beginning to 160° F. at the end of the process. A satisfactory product may be obtained by using the following processing temperatures and times with tray loadings from 1.0 to 1.4 pounds per square foot of tray surface.

| Radiant heat temperatures | Minutes of exposure |
|---|---|
| 307° F | 36 |
| 250° F | 36 |
| 240° F | 18 |
| 228° F | 36 |
| 193° F | 36 |

The following table shows a number of complete runs on soy beans. The operation is carried out in a drying chamber having nine banks of heating coils numbered from 1 to 9 consecutively. The material was contained in trays introduced in sets of 48, comprising 6 vertical layers and 8 horizontal rows in each group which were introduced in a buggy as described in the Heineman application already referred to. The reference to tray levels counts them from the top.

| | Time | Drying bank No. | Steam pres. | Pretreatment | Per cent moisture at cooker | | Cooking | | Tray lev. | Final moisture, per cent | Loading, lbs./sq. ft. | Per cent reconstitution |
|---|---|---|---|---|---|---|---|---|---|---|---|---|
| | | | | | In | Out | Min. | Pres. | | | | |
| I | 90 min | 1 and 2<br>3 and 4<br>5<br>6 and 7<br>8 and 9 | 110<br>80<br>20<br>5<br>5″ vac | Soaked 48 hrs. at 45° F<br>Above soak plus 1 hr. cook at 240° F. | 62.1<br>62.1<br>62.8<br>62.8 | 57.6<br>57.6<br>62.6<br>62.6 | 14.4<br>14.4<br>2<br>2 | 10#<br>10#<br>20″ of vac.<br>20″ of vac. | 3<br>4<br>2<br>1 | 5.4<br>5.1<br>6.5<br>7.5 | 1.0<br>1.0<br>1.0<br>1.36 | 69.1<br>71.7<br>70.7<br>71.1 |
| II | 90 min | 1 and 2<br>3 and 4<br>5<br>6 and 7<br>8 and 9 | 110<br>70<br>20<br>5<br>5″ vac | For all: soaked 12 hrs., cooked 1 hr. at 240° C. | 59.8<br>59.8<br>59.8<br>59.8<br>59.8<br>59.8 | 61.2<br>61.2<br>60.1<br>60.1<br>65.1 | 2 for all. | 20″ of vac. for all. | 1<br>2<br>1<br>1<br>1<br>1 | 2.2<br>2.7<br>1.8<br>0.8<br>1.3<br>0 | 0.8<br>0.8<br>0.8<br>1.0<br>0.8<br>0.8 | 65.5<br>65.5<br>63.5<br>67.9<br>64.0<br>56.5 |
| III | 162 min | 1 and 2<br>3 and 4<br>5<br>6 and 7<br>8 and 9 | 60<br>20<br>10<br>5<br>10″ vac | Soaked 12 hrs. and cooked 1 hr. at 240° F. | 65.6<br>65.6<br>63.5<br>63.5<br>63.5<br>62.0<br>63.5<br>63.5 | 64.2<br>64.2<br><br><br><br>63.1<br><br> | 2 for all. | 2 p. s. i. for all. | 3<br>3<br>1<br>3<br>6<br>3<br>3<br>3 | 5.6<br>4.2<br>3.0<br>5.5<br>3.7<br>4.9<br>2.1<br>4.0 | 1.4<br>1.4<br>1.4<br>1.4<br>1.4<br>1.4<br>1.0<br>1.2 | 73.1<br>69.2<br>59.3<br>61.1<br>64.1<br>61.6<br>59.1<br>62.2 |

The reconstitution test was made after 30 minutes in room temperature water and then draining the product. The figure given represents the rehydrated weight divided by the original soaked weight.

The products from the third sample showed the following yields:

| | Pounds | Per cent |
|---|---|---|
| Raw dry beans | 400 | 100 |
| Soaked | 951 | 238 |
| Cooked | 995 | 249 |
| To dehydrator | 960 | 240 |
| Yield from dehydrator | 345 | 86 |
| Theot. yield from 995 cooked | 358 | 89 |

The foregoing detailed description has been given for clearness of understanding only, and no unnecessary limitations should be understood therefrom.

What I claim as new and desire to secure by Letters Patent is:

1. The method of drying soy beans which comprises soaking normally dry soy beans at 45° to 70° F. for 10 to 48 hours to increase the moisture content thereof substantially more than 100% by weight, cooking the moistened beans in an atmosphere of substantially saturated steam in the absence of air, and then drying the cooked beans in an atmosphere substantially of superheated steam at sub-atmospheric pressure while subject to intense radiant energy.

2. The method as set forth in claim 1, in which the beans are cooked at temperatures from 200° to 250° F. for a period of 10 to 180 minutes.

3. The method as set forth in claim 1, in which the beans are dried on screen bottom trays while loaded at densities of 0.8 to 1.4 lbs. per square foot.

4. The method as set forth in claim 1, in which the beans are cooked in an atmosphere of substantially saturated steam in the absence of air at temperatures from 200° to 250° F. for from 30 to 10 minutes, and immediately following the cooking the temperature of the beans is reduced by reduction of the pressure to a low absolute pressure.

5. The method of drying soy beans which comprises loading on screens at densities from 0.8 to 1.4 lbs. per square foot, cooking the beans and then drying the beans in an atmosphere of superheated steam at low absolute pressure while subject to intense radiant energy on all sides, the source of the radiant energy having a temperature of 350° F. to 160° F. for a distance from the product of approximately 3 inches.

6. The method as set forth in claim 5, in which the beans are cooked in the absence of air in an atmosphere of saturated steam at temperatures from 200° to 250° F., the pressure is then reduced to the order of ½ inch of mercury absolute, and the beans then introduced to the vacuum dryer without contact with the atmosphere.

ROBERT M. SCHAFFNER.